United States Patent
Quero et al.

(10) Patent No.: US 8,836,185 B2
(45) Date of Patent: Sep. 16, 2014

(54) MOTOR POWER CONNECTION BOX AND THREE-PHASE MOTOR

(75) Inventors: Jose Quero, Bietigheim-Bissingen (DE); Steffen Lentmaier, Grossbottwar (DE); Mike Wenzel, Heilbronn (DE)

(73) Assignee: LQ Mechatronik-Systeme GmbH, Besigheim (DE)

( * ) Notice: Subject to any disclaimer, the term of this patent is extended or adjusted under 35 U.S.C. 154(b) by 289 days.

(21) Appl. No.: 13/299,561

(22) Filed: Nov. 18, 2011

(65) Prior Publication Data

US 2012/0126647 A1   May 24, 2012

(30) Foreign Application Priority Data

Nov. 18, 2010   (DE) .................... 10 2010 044 143

(51) Int. Cl.
   *H02K 11/00*   (2006.01)
(52) U.S. Cl.
   USPC ............................................................ 310/71
(58) Field of Classification Search
   USPC ................................................. 310/71, 88, 89
   See application file for complete search history.

(56) References Cited

U.S. PATENT DOCUMENTS

| | | | |
|---|---|---|---|
| 3,602,748 A | 8/1971 | Locke | |
| 5,017,818 A * | 5/1991 | Dohogne | 310/71 |
| 2002/0043883 A1* | 4/2002 | Shimizu | 310/71 |
| 2003/0141771 A1* | 7/2003 | Leany et al. | 310/71 |

FOREIGN PATENT DOCUMENTS

| | | |
|---|---|---|
| DE | 845 077 C | 7/1952 |
| DE | 1 121 198 B | 1/1962 |
| DE | 2 012 246 | 10/1970 |
| DE | 38 03 164 A1 | 8/1989 |
| DE | 197 54 694 A1 | 6/1999 |
| EP | 1 104 080 A2 | 5/2001 |
| EP | 1 237 260 A2 | 9/2002 |
| EP | 1 895 642 A2 | 3/2008 |

OTHER PUBLICATIONS

Search Report of European Patent Office issued in European Application No. 11 18 9715.3 with English translation of category of cited documents dated Feb. 19, 2013 (7 pages).
Examination Report from German Patent Office dated Aug. 3, 2011 (6 pages).

\* cited by examiner

*Primary Examiner* — Hanh Nguyen
(74) *Attorney, Agent, or Firm* — Flynn, Thiel, Boutell & Tanis, P.C.

(57) ABSTRACT

A motor power connection box including a housing, in which electrical motor connecting contacts and also power connectors are provided, and which further includes an electrical contacting arrangement adapted to connect the power connectors to the electrical motor connecting contacts according to specified power functions, and which includes a cover capable of being fitted on the housing.
The cover is capable of being fitted to the housing in different orientations, and in the cover the electrical contacting arrangement is disposed so as to provide at least two fixed contacting configurations for at least two different power functions alternately assigned to different alignments of the cover.

18 Claims, 4 Drawing Sheets

MOTOR POWER CONNECTION BOX AND THREE-PHASE MOTOR

FIELD OF THE INVENTION

The invention relates to a motor power connection box for a three-phase motor, which motor power connection box comprises a housing in which there are provided electrical motor connecting contacts and power supply connectors that can be connected to a power source, and further comprises electrical contacting means for the purpose of connecting the power supply connectors to the electrical motor connecting contacts according to predetermined performance functions, and also comprises a cover that can be fitted to the housing. The invention also relates to a three-phase motor comprising a motor power connection box of this type.

BACKGROUND OF THE INVENTION

The use of a motor power connection box of this type for a three-phase motor is well known. The electrical contacting means are in the form of wiring connections that are soldered or clamped to the motor connecting contacts and the power supply connectors to give the desired performance function.

EP 1 895 642 A2 also discloses a motor power connection box for a three-phase motor, which motor power connection box comprises a housing and a cover. An electronic circuit for electrically influencing the respective three-phase motor is integrated in the cover. In order to provide different performance functions, different covers are provided that provide different electronic functions, which covers can be fitted to the housing and can be replaced according to the desired application. The different covers use the same electrical or mechanical interface to the bottom portion, that is to say, to the housing, in order to communicate with the electrical systems accommodated in the housing.

It is an object of the invention to provide a motor power connection box and a three-phase motor of the above type that exhibit improved variability.

As regards the motor power connection box, this object is achieved by making it possible to fit the cover to the housing in different orientations, and by integrating the electrical contacting means in the cover in at least two defined contacting configurations providing at least two different performance functions, which are alternately assigned to different orientations of the cover such that one of the performance functions is set whenever the cover is fitted to the housing. Thus the at least two different contacting configurations in the cover comprise contact points that are oriented toward the housing and that come into electrical contact with the power supply connectors and the motor connecting contacts when the cover is fitted to the housing. Thus the contacting configurations in the cover form suitable bridges or some other types of electrical connection for the purpose of setting one or other of the at least two different performance functions whenever the cover is fitted to the housing. The contacting configurations provide the missing conductors in the said electrical circuits for achieving a defined performance function. Typical performance functions include the operation of the three-phase motor in a Y connection or in a delta connection. Very preferably, the three-phase motor is an asynchronous motor. Only one of the said connections is completed and thus only one performance function for controlling the three-phase motor is available whenever the cover is fitted to the housing. Depending on the orientation, that is to say, the position in which the cover is fitted relative to the housing, it is possible to accomplish one or other of said connections and performance functions. In particular, the solution of the invention makes it possible to operate the three-phase motor in a delta connection or a Y connection by simply repositioning the cover. According to the solution provided by the invention, the three-phase motor can be operated in at least two different performance variants without the use of additional components that would have to replace existing components. According to the invention, the electrical contacting means comprise plug contacts or surface contacts in order to establish an electrical connection to the electrical contact points disposed in the housing.

In one embodiment of the invention, there are provided mechanical coding means on the cover and on the housing in order to enable the cover to be fitted to the housing in a defined manner depending on the performance function to be set. In a further embodiment involving indicating means that can be detected visually, haptically, or acoustically and that makes it possible to detect the performance function set according to the selected orientation of the cover after the cover has been fitted to the housing, such indicating means being assigned to the cover and/or the housing. In a particularly preferred exemplary embodiment, symbols are provided at two opposing edge regions of the housing for the purpose of indicating the delta connection or Y connection. There is provided an opening in the cover that registers with one or other of the symbols when the cover is fitted to the housing such that the symbol can be perceived in the fitted state of the cover. The contacting configurations are assigned inside the cover such that the performance function of the Y connection is also set when the symbol denoting the Y connection can be detected after the cover has been fitted to the housing. In a different orientation of the cover, it is then possible to perceive the other symbol through said opening. In a preferred embodiment of the invention, the different contacting configurations are offset through 180° relative to each other so that repositioning of the cover by 180° results in one or the other performance variant being set. This embodiment is advantageous in the case of covers and housings having a square base. Also, designs of the housing and cover that are polygonal and mirror-symmetrical relative to a central axis enable the cover to be repositioned in different angular positions that are predefined by the number of corners. Finally, it is possible to provide a cover and a housing having circular contact surfaces that likewise enable the cover to be fitted and oriented in different positions.

In a further embodiment of the invention, additional electric or electronic functional elements that are assigned to the respective performance functions are integrated in the cover. These electric or electronic functional elements can supplement the performance functions or generate additional functions. A particularly advantageous embodiment is intended for the suppression of interference. Advantageously, at least one capacitor can be used as an electric functional element for this purpose.

In a further embodiment of the invention, the cover is in the form of a single-part or multi-part component. Even when the cover is a multi-part component, it will form a component that can be handled as one piece when in its mounted functional position.

In a further embodiment of the invention, the cover can be removably or irremovably mounted on the housing. The possibility of removably mounting the cover on the housing is advantageous, since it is then possible to alter the performance characteristics or the performance function of the three-phase motor at a later point in time, according to requirements, by simply removing and repositioning the cover.

In a further embodiment of the invention, the cover is made of a plurality of cover layers which are superposed and capable of being joined together permanently and which comprise different contacting configurations and/or electric or electronic functional elements. A multilayered design of the cover makes it possible to achieve different function levels for electrical or electronic functions. The common feature of all the variants is that the cover can be handled as a single-part component following the assembly of the different cover layers and can be fitted to the housing in different orientations, as a result of which different connections of power supply connectors to motor connecting contacts can be achieved, depending on the orientation of the cover relative to the housing.

In an embodiment of the three-phase motor that is provided with a motor power connection box of such type, the motor power connection box is mounted on the motor housing by means of an adapter plate. As a result, it is always possible to attach the motor power connection box to the mounting point on the motor housing, irrespective of the dimensions of the motor power connection box.

BRIEF DESCRIPTION OF THE DRAWINGS

Additional advantages and features of the invention are revealed in the claims and in the following description of a preferred exemplary embodiment of the invention that is described below with reference to the drawings, in which:

DETAILED DESCRIPTION

Figure 1:
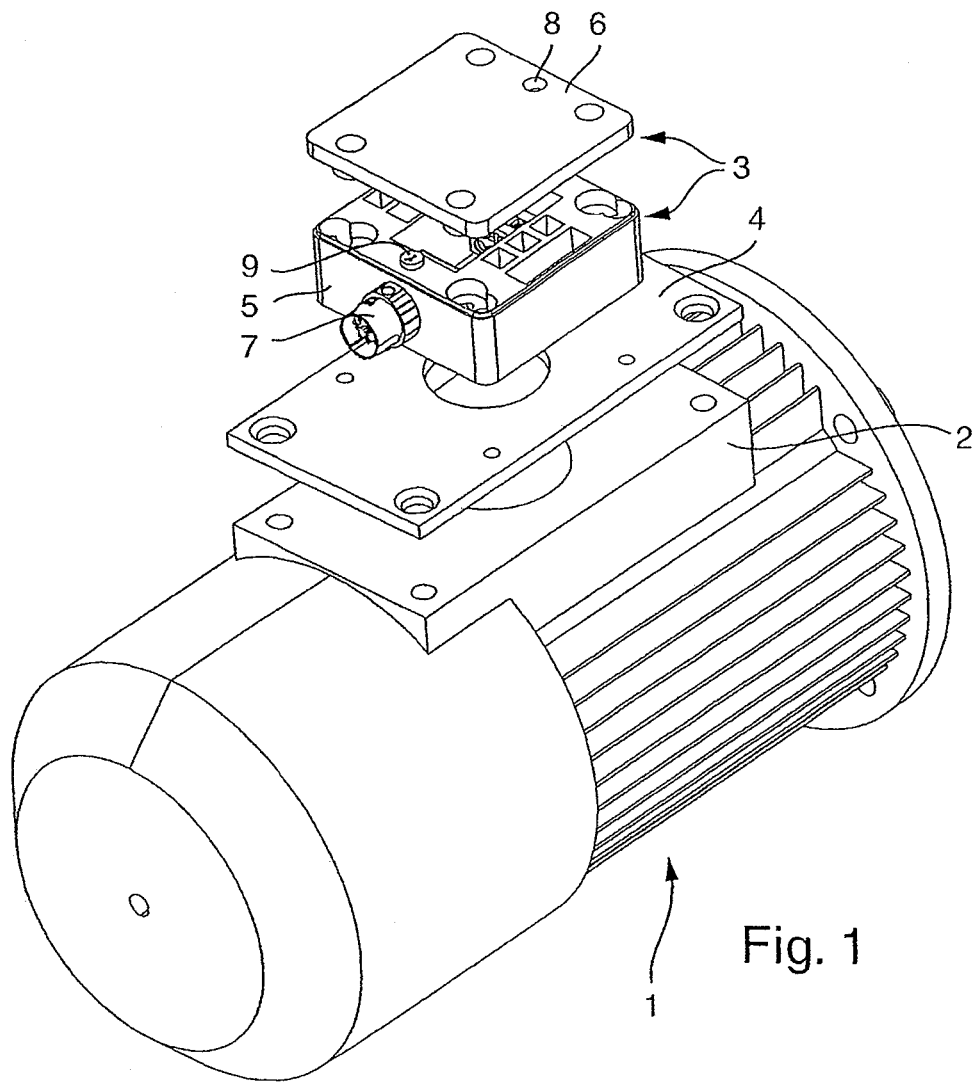
FIG. 1 is an exploded view of a diagrammatically illustrated embodiment of a three-phase motor of the invention including an embodiment of a motor power connection box of the invention.
Figure 2:
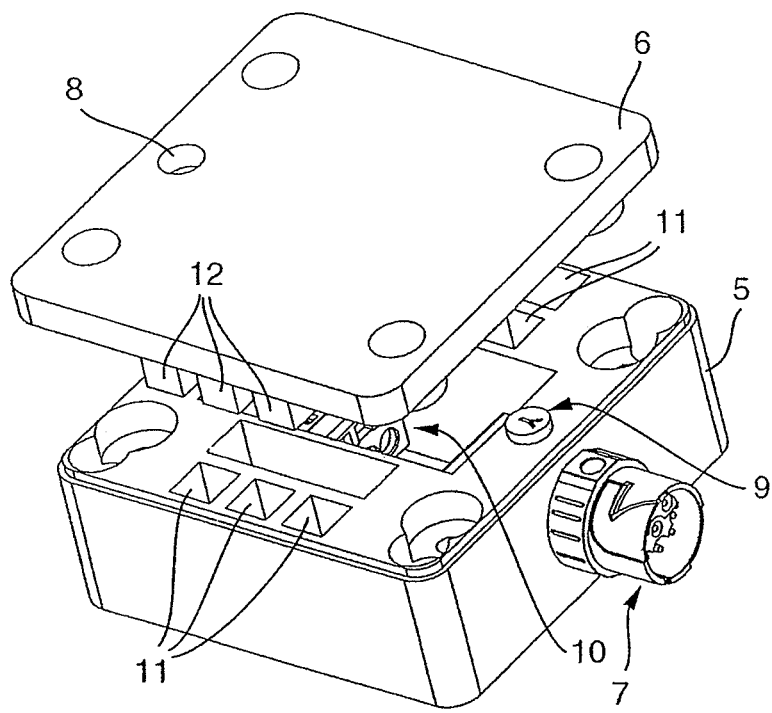
FIG. 2 is an exploded perspective view of the motor power connection box shown in FIG. 1.
Figure 3:
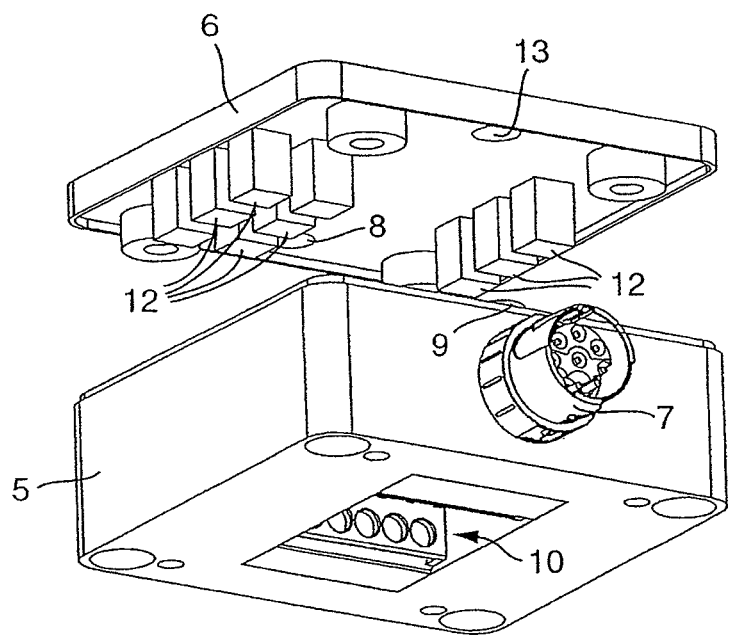
FIG. 3 is a further exploded perspective view of the motor power connection box shown in FIG. 2.
Figure 4:
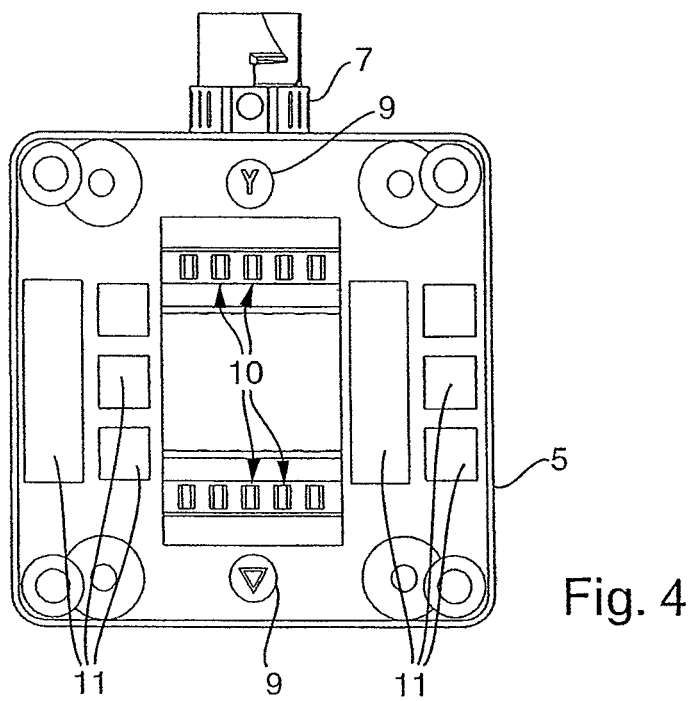
FIG. 4 is a diagrammatic top view of a housing of the motor power connection box shown in FIGS. 2 and 3.
Figure 5:
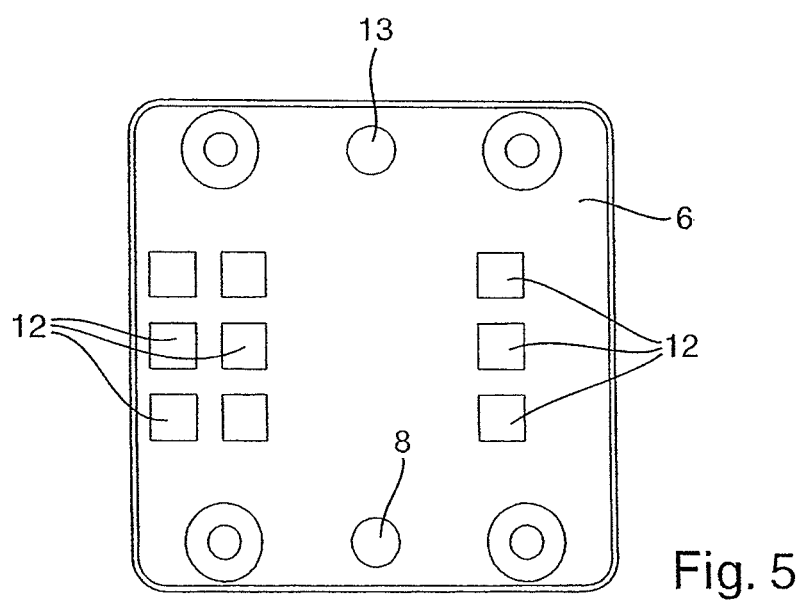
FIG. 5 is a view of the underside of a cover of the motor power connection box shown in FIGS. 2 and 3, and FIGS. 6a and 6b are alternative circuit diagrams for different performance functions of the three-phase motor that can be selected by way of the cover shown in FIG. 5.

The three-phase motor shown in FIG. 1 is an asynchronous motor. The three-phase motor 1 comprises a motor housing that is provided with a housing flange 2 for the attachment of a motor power connection box 3. The housing flange 2 is integral with a cast component that forms the motor housing. The housing flange 2 has a rectangular base, the corner regions of which are provided with, in all, four screw-threaded bores for the attachment of the motor power connection box 3. The motor power connection box 3 has a substantially square base in the exemplary embodiment shown in FIGS. 1 to 5 and is mounted on the housing flange 2 by means of an adapter plate 4. The adapter plate 4 has a rectangular shape that is configured to match the base of the housing flange 2 and is provided with four holes which align with the screw-threaded bores in the housing flange 2 and through which cap screws can be inserted and screwed into the screw-threaded holes of the housing flange 2. The adapter plate 4 is further provided with screw-threaded holes (not shown) that align with corner regions of the square base of the motor power connection box 3. The motor power connection box 3 can be screwed to the adapter plate 4 by means of suitable screw connections. The motor power connection box 3 is mounted onto the housing flange 2 of the three-phase motor 1 by mounting the adapter plate 4 onto the housing flange 2 and then attaching the motor power connection box 3 to the adapter plate 4.

The motor power connection box 3 comprises a housing 5, which is preferably made of plastics material and to which a cover 6 that is likewise preferably made of plastics material can be fitted. In the housing 5, there are disposed motor connecting contacts 10 which, in the functional state of the three-phase motor 1, are connected to corresponding electrical conductors of the three-phase motor 1. The electrical lines comprise corresponding connectors of three electromagnetic coils that are disposed in the three-phase motor in a basically known manner.

Also situated in the housing 5 are power supply terminals which in the functional state of the three-phase motor 1 are connected to a power source. For this purpose, a connecting plug 7 is also provided externally on the housing 5 and this is connected to the power supply terminals inside the housing 5. An appropriate power cable can be connected thereto for the supply of three-phase alternating current.

Electrical contacting means 12 for connecting the power supply terminals disposed in the housing 5 to the motor connecting contacts are provided in the cover 6. In the exemplary embodiment shown, the different electrical contacting means 12 protrude downwardly from the underside of the cover 6.

Suitable mechanical and electrical socket openings 11, into which the electrical contacting means 12 are inserted when the cover 6 is fitted to the housing, are provided in a complementary manner in the housing 5. The electrical contacting means 12 form two contacting configurations in the cover 6, which are independent of each other and which are fixed in the cover 6 and only one of which comes into functional contact with the socket holes 11 in the housing 5 at any one time, once the cover 6 has been fitted to the housing. The socket holes 11 encompass the corresponding electrical motor connecting contacts and power supply connectors such that the appropriately fixed electrical contacting configuration produces the desired electrical bridges and conducting connections between the corresponding power supply connectors and the motor connecting contacts, once the cover 6 has been fitted to the housing. The two contacting configurations in the cover 6, which are independent of each other, are such that they provide two different performance functions of the three-phase motor. For this purpose, one contacting configuration is such that the corresponding power supply connectors and motor connecting contacts inside the housing 5 are connected to each other in the form of a Y connection. The other contacting configuration is such that corresponding motor connecting contacts and power supply connectors are connected together in the form of a delta connection, once the cover has been fitted to the housing. In order to connect one or other of the contacting configurations effectively to the corresponding motor connecting contacts and the power supply connectors, the cover 6 is fitted to the housing 5 either in a first orientation or in a second orientation in which the cover 6 is rotated through 180° in the plane of the cover relatively to the first orientation.

Figure 6A:
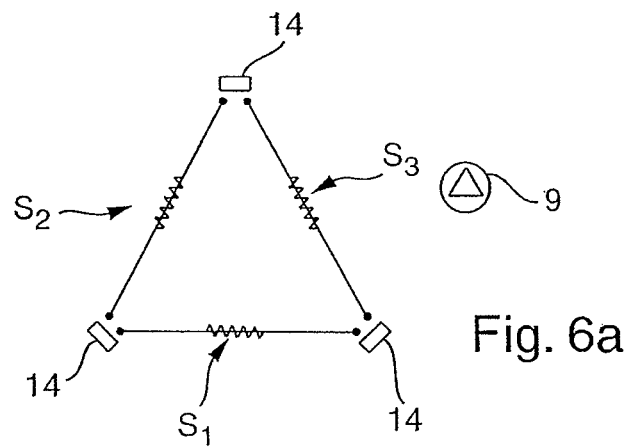
Figure 6B:
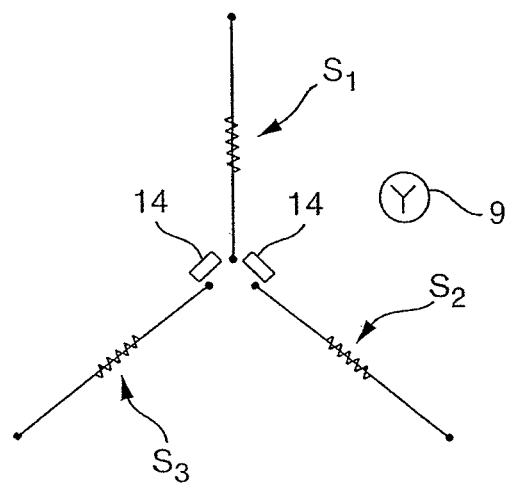

FIGS. 6a and 6b show the manner in which the contacting configurations assign the three phase conductors of the power supply connectors to the connecting contacts of the three electromagnetic coils $S_1$ to $S_3$ inside the three-phase motor 1 in the delta connection or in the Y connection (FIG. 6b). The assignment of the three phase conductors of the AC. cable to the connecting contacts of the electromagnetic coils $S_1$ to $S_3$ in the delta connection or Y connection is basically known to the person skilled in the art. Corresponding electrical bridges 14 connect the connecting contacts of the coils $S_1$ to $S_3$ to each other in a suitable manner. Additionally, the phase conductors of the power supply terminals are connected to the other connecting contacts of the coils $S_1$ to $S_3$ (FIG. 6b) or to the corners of the triangle formed in the region of the electrical bridges 14 according to the alternative circuit diagram shown in FIG. 6a.

Both the contacting configuration for the delta connection and the contacting configuration for the Y connection are permanently laid in the cover 6 and are attached to the underside of the cover. When the cover 6 is fitted to the housing, the respective contacting configuration is capable of being connected to the corresponding socket connections in the housing 5 by way of electrical plug contacts. Alternatively, spring-biased surface contacts may be provided that ensure electrical contact in the fitted state of the cover.

In order to ensure, firstly, that the cover 6 is fitted to the housing in a defined manner in an orientation providing any one of the desired performance functions of the three-phase motor 1, namely the Y connection or the delta connection, there is provided a mechanical press-on profile in the region of the housing 5, on the one hand, and in the region of the cover 6, on the other. These profiles ensure that the cover 6 is fitted to the housing securely and tightly. The electrical plug contacts may form an integral part thereof.

Furthermore, indicating means 8, 9, 13 are provided that include an opening 8 in the cover 6 and two symbols 9 for indicating the delta connection and the Y connection respectively disposed in the housing 5 at opposite lateral locations thereof. The symbols 9 are arranged so as to register with the opening 8 in the cover 6 such that an observer fitting the cover 6 to the housing can perceived which of the two symbols 9 is visible when he or she looks through the opening 8 in the form of hole. The symbols 9 are such that the contacting configuration in the delta connection comes into operation when the delta symbol is perceived, and the contacting configuration provided for the Y connection in the cover 6 comes into effect when the symbol defining the Y connection is perceived through the opening 8. A circular cavity 13 is provided opposite to the opening 8 in the cover 6, which circular cavity 13 is closed toward the top surface of the cover 6. The two symbols 9 are in the form of convex bosses, the circular shape of which matches that of the opening 8 and the cavity 13. When the cover 6 is fitted to the housing, the two bosses fit into either the opening 8 or the cavity 13 depending on the orientation of the cover 6. Thus, when the cover 6 has been fitted to the housing, an observer can perceive, from above, the performance function that has been selected in the motor power connection box 3 according to the connection relevant to the three-phase motor, namely either the Y connection or the delta connection. The contacting configurations 12 in the cover 6 and the plug sockets 11 in the housing 5 that are provided with the motor connecting contacts and the power supply connectors are such that an electrical plug-and-socket connection is established between the contacting configurations and the corresponding electrical connectors in the housing 5 when the cover 6 is fitted to the housing.

The housing 5 is screwed, by means of screw connections provided at the corners of the housing, to the adapter plate 4 previously mounted on the housing flange 2 of the motor housing. Adjacent to corresponding openings in the housing 5 for these screw connections, further female mounting means are provided, into which mounting screws pertaining to the cover can be inserted in order to removably secure the cover 6 on the housing. These mounting screws are passed from above through appropriate holes in the cover 6 and are screwed into the female mounting means.

The invention claimed is:

1. A motor power connection box for a three-phase motor comprising a housing, in which electrical motor connecting contacts and also power connectors that can be connected to a power source are provided, and further comprising electrical connectors for connecting said power connectors to said electrical motor connecting contacts according to specified power functions, and further comprising a cover that can be fitted to said housing, wherein said cover can be fitted on said housing in different orientations, and in said cover the electrical connectors are provided in at least two fixed contacting configurations for at least two different power functions, the different orientations of said cover being alternately assigned such that each of the different orientations determines which of said power functions is selected, and wherein when said cover is fitted to said housing, said cover covers all of said electrical motor connecting contacts and said power connectors.

2. The motor power connection box as defined in claim 1, wherein said cover and/or said housing are adapted to detect optically, haptically or acoustically a detectable indicator, which indicates which one of said power functions has been selected on account of said different orientations of said cover following fitting thereof on said housing.

3. The motor power connection box as defined in claim 1, wherein a mechanical coder is provided on said cover and on said housing to make it possible to fit said cover to said housing in a defined manner depending on one of said selected power functions.

4. The motor power connection box as defined in claim 1, wherein said power functions involve a Y connection and a delta connection.

5. The motor power connection box as defined in claim 1, wherein further electrical or electronic functional elements are provided in said cover, each of which is assigned to one of said power functions.

6. The motor power connection box as defined in claim 1, wherein said cover comprises one or more parts.

7. The motor power connection box as defined in claim 6, wherein said cover is composed of a plurality of superposed cover layers which are capable of being permanently joined together and which comprise different contacting configurations and/or electrical or electronic functional elements.

8. The motor power connection box as defined in claim 1, wherein said cover is capable of being removably or irremovably mounted on said housing.

9. A three-phase motor comprising a motor power connection box as defined in claim 1.

10. The three-phase motor as defined in claim 9, wherein said motor power connection box is attached to a motor housing by way of an adapter plate.

11. The three-phase motor as defined in claim 9, wherein said three-phase motor is an asynchronous motor.

12. The motor power connection box as defined in claim 1, wherein the electrical connectors in said cover are provided in only two fixed contacting configurations for only two different power functions.

13. The motor power connection box as defined in claim 1, wherein said electrical connectors comprise sets of electrical connectors, and said contacting configurations are independent of each other such that only one of the sets of electrical connectors comes into contact with said electrical motor connecting contacts and said power connectors at any one time.

14. The motor power connection box as defined in claim 1, wherein said housing includes a plurality of indicators for indicating which of said fixed contacting configurations is selected and said cover includes a hole therethrough for viewing one of the indicators.

15. A motor power connection box for a three-phase motor comprising:
a housing having electrical motor connecting contacts and power connectors that can be connected to a power source; and
a cover that can be fitted to the housing in different orientations, the cover including electrical connectors for connecting the power connectors to the electrical motor connecting contacts according to specified power functions;
the electrical connectors being provided in the cover in at least two fixed contacting configurations for at least two different power functions, the different orientations of the cover being alternately assigned such that each of the different orientations of the cover determines which of the power functions is selected;
wherein, when the cover is fitted to the housing, the cover encloses all of the electrical motor connecting contacts and the power connectors in the housing.

16. The motor power connection box as defined in claim 15, wherein the electrical connectors in the cover are provided in only two fixed contacting configurations for only two different power functions.

17. The motor power connection box as defined in claim 15, wherein the electrical connectors comprise sets of electrical connectors, and the contacting configurations are independent of each other such that only one of the sets of electrical connectors comes into contact with the electrical motor connecting contacts and the power connectors at any one time.

18. The motor power connection box as defined in claim 15, wherein the housing includes a plurality of indicators for indicating which of the fixed contacting configurations is selected and the cover includes a hole therethrough for viewing one of the indicators.

* * * * *